(12) United States Patent
Kizer et al.

(10) Patent No.: US 11,085,389 B1
(45) Date of Patent: Aug. 10, 2021

(54) METHODS AND SYSTEM FOR AUTOMATIC ENGINE STOPPING

(71) Applicant: Ford Global Technologies, LLC, Dearborn, MI (US)

(72) Inventors: Lucas Kizer, Dundee, MI (US); Craig Lechlitner, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/877,757

(22) Filed: May 19, 2020

(51) Int. Cl.
*F02D 41/04* (2006.01)
*F02N 11/08* (2006.01)
*F02D 41/00* (2006.01)
*F02D 41/22* (2006.01)
*F02D 41/14* (2006.01)

(52) U.S. Cl.
CPC ....... *F02D 41/042* (2013.01); *F02D 41/0007* (2013.01); *F02D 41/22* (2013.01); F02D 41/1497 (2013.01); F02D 2041/227 (2013.01); F02D 2200/602 (2013.01); F02D 2250/18 (2013.01); F02N 11/0818 (2013.01); F02N 2200/061 (2013.01); F02N 2200/101 (2013.01)

(58) Field of Classification Search
CPC .............. F02D 41/042; F02D 41/0007; F02D 41/1497; F02D 41/122; F02D 2200/602; F02D 2200/101; F02D 2250/18; F02D 2041/227; F02N 11/0818; F02N 2200/1497; F02N 2200/061
See application file for complete search history.

(56) References Cited

U.S. PATENT DOCUMENTS

| | | | |
|---|---|---|---|
| 6,532,926 B1* | 3/2003 | Kuroda | B60H 1/00778 123/179.4 |
| 9,677,529 B2 | 6/2017 | Ohsaki | |
| 2002/0007626 A1* | 1/2002 | Kitajima | F01N 9/005 60/274 |
| 2010/0006078 A1* | 1/2010 | Shoda | F02N 11/0829 123/676 |
| 2011/0146945 A1* | 6/2011 | Morita | B60H 1/00764 165/51 |
| 2013/0092030 A1* | 4/2013 | Nishizawa | F02N 11/0829 96/425 |
| 2014/0230783 A1* | 8/2014 | Sugihara | F02D 41/042 123/339.1 |
| 2015/0073675 A1* | 3/2015 | Malone | B60W 10/06 701/70 |
| 2017/0203637 A1* | 7/2017 | Berkson | B60L 1/02 |
| 2018/0142592 A1* | 5/2018 | Crawford | F01N 3/2013 |
| 2018/0326988 A1* | 11/2018 | Lechlitner | B60K 6/442 |
| 2019/0128231 A1 | 5/2019 | Kajiwara | |

* cited by examiner

*Primary Examiner* — George C Jin
(74) *Attorney, Agent, or Firm* — David Kelley; McCoy Russell LLP

(57) ABSTRACT

A method for operating a vehicle that may be automatically stopped and started is described. In one example, the method includes inhibiting automatic engine stopping in response to a temperature of an emissions device exceeding a threshold temperature. In addition, additional actions may be taken to reduce the temperature of the emissions device when automatic engine stopping is inhibited.

19 Claims, 4 Drawing Sheets

METHODS AND SYSTEM FOR AUTOMATIC ENGINE STOPPING

FIELD

The present description relates to methods and a system for automatically stopping an internal combustion engine. The methods and systems provide for inhibiting automatic engine stopping during select conditions.

BACKGROUND AND SUMMARY

An internal combustion engine of a vehicle may be automatically stopped (e.g., the engine ceases rotating and combusting fuel) from time to time. The automatic engine stopping may be performed via an engine controller without input of a human vehicle operator to an input that is dedicated solely to accepting engine stopping and/or stopping requests (e.g., a key switch or pushbutton input). The engine may be automatically stopped by ceasing to supply fuel to engine cylinders and increasing electric machine torque to reduce engine speed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
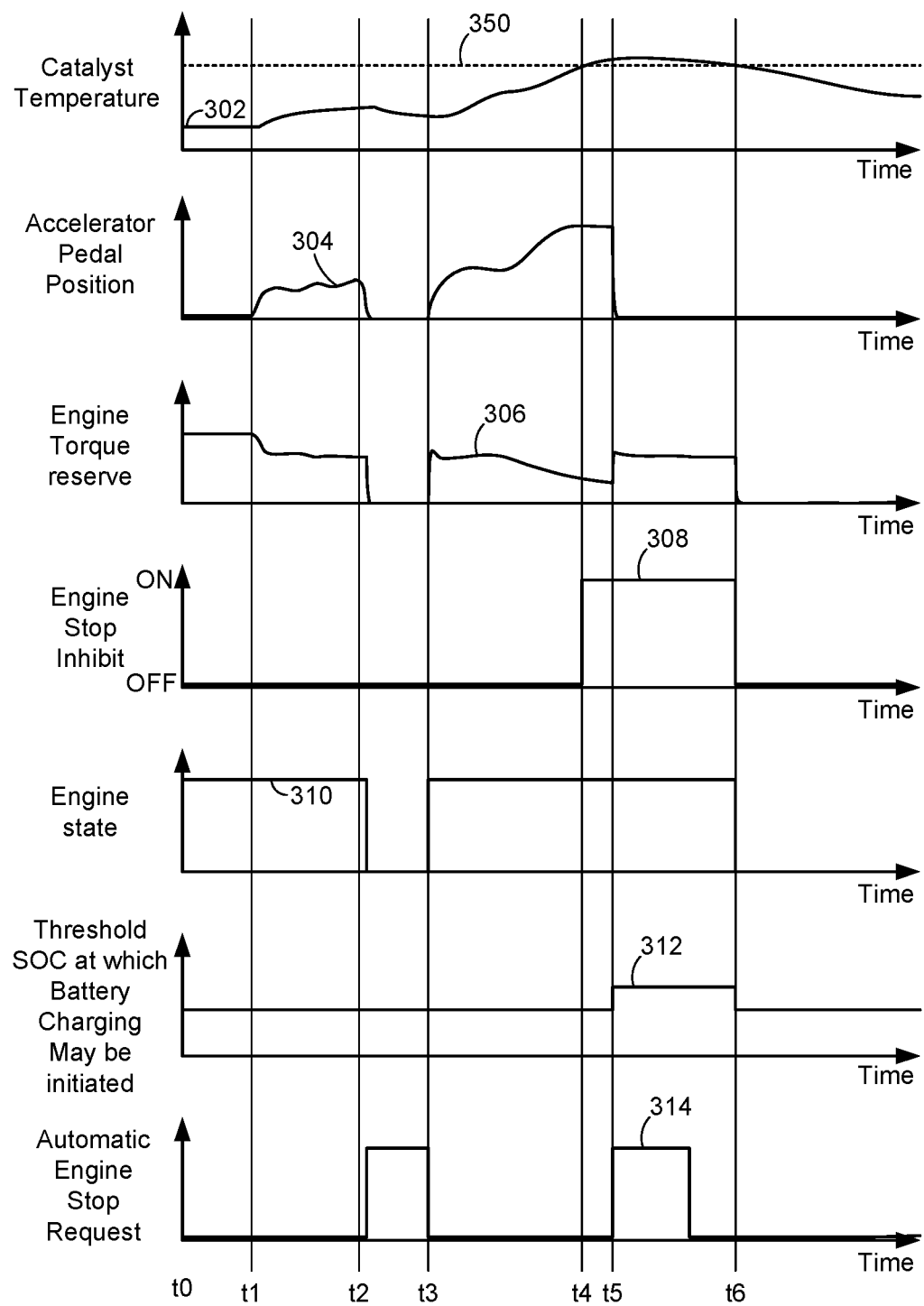
FIG. 3 shows an example vehicle operating sequence according to the method of FIG. 4.
Figure 4:
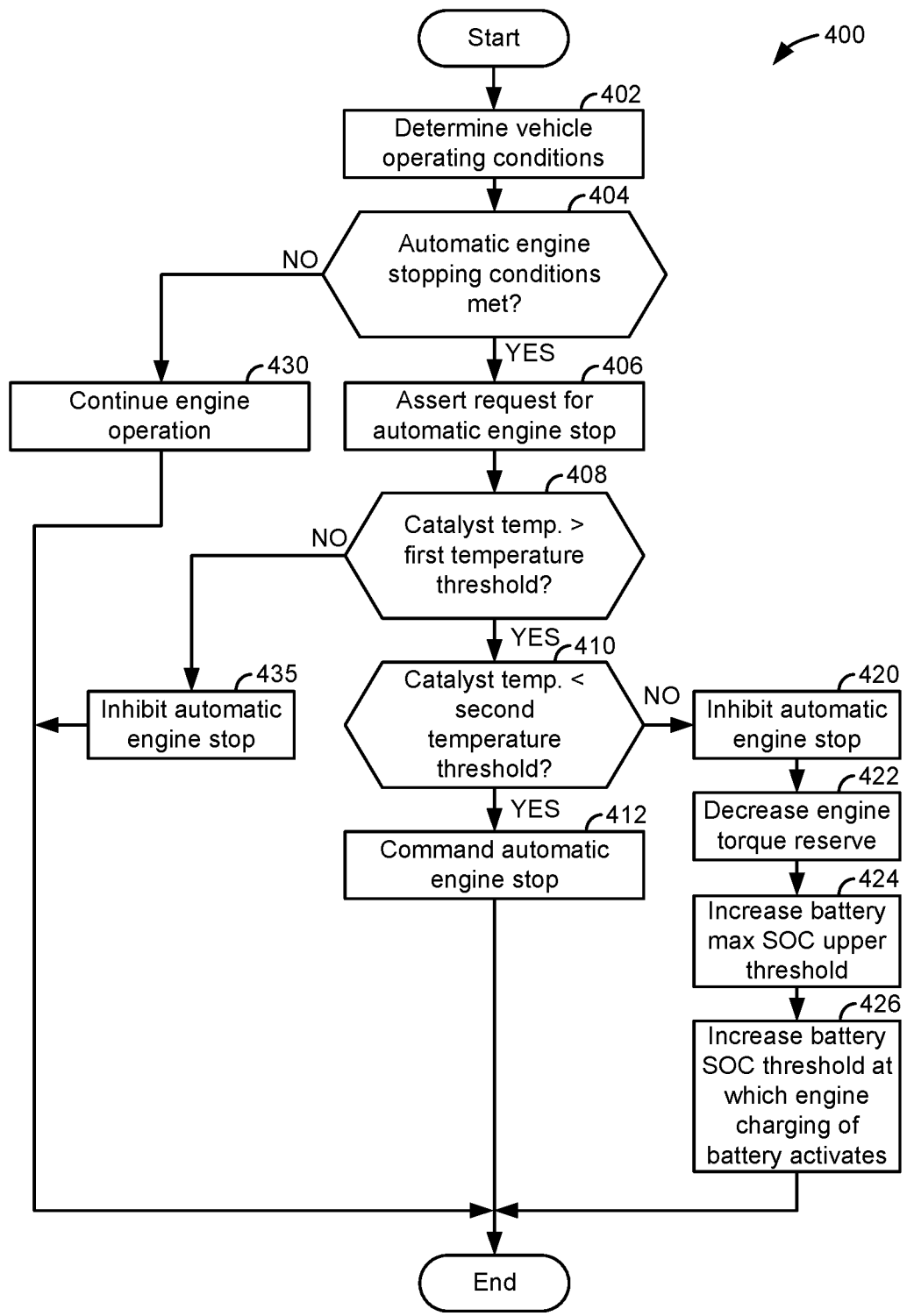
FIG. 4 shows a flowchart of an example method for inhibiting automatic engine stopping.

The present description is related to inhibiting automatic stopping of an internal combustion engine. The engine may be automatically stopped according to vehicle operating conditions to conserve fuel. However, there may be times or instances when it may not be desirable to automatically stop the engine even though automatically stopping the engine may reduce engine fuel consumption. The engine and driveline may be of the type shown in FIGS. 1 and 2. The driveline may be operated according to the methods of FIG. 4 as shown in the sequence of FIG. 3 to continue engine operation even when some conditions have been met for automatically stopping the engine. A method for permitting and inhibiting automatic engine stopping is shown in FIG. 4.

Automatically stopping an engine of a vehicle may conserve fuel; however, automatically stopping an engine may hasten degradation of vehicle components during some conditions. For example, if an engine was operating under high speed and high load conditions, exhaust gases from the engine and reactions within a catalyst may cause temperatures within a catalyst to be raised. If the engine is automatically stopped before the catalyst has been cooled sufficiently, degradation of the catalyst may result. Degradation of the catalyst may reduce the vehicle's capacity to meet emissions levels. Therefore, it may be desirable to provide a way of reducing the possibility of catalyst degradation during conditions when it may be desirable to stop the engine to reduce fuel consumption.

The inventors herein have recognized the above-mentioned issues and have developed a method for operating a vehicle, comprising: inhibiting automatic engine stopping via a controller in response to a temperature of an emissions device being greater than a threshold temperature.

By inhibiting automatic engine stopping, it may be possible to achieve the technical result of reducing emissions device degradation. In one example, automatic engine stopping may be inhibited so that cooler exhaust gases produced during low engine load conditions may cool the emissions device. Once the temperature of the emissions device is below the threshold temperature, the engine may be automatically stopped to reduce engine fuel consumption.

The present description may provide several advantages. Specifically, the approach may reduce a possibility of emissions device degradation. Further, the approach may speed emissions device cooling so that vehicle fuel consumption may be reduced. In addition, the approach may provide useful engine work while the emissions device is being cooled.

The above advantages and other advantages, and features of the present description will be readily apparent from the following Detailed Description when taken alone or in connection with the accompanying drawings.

Figure 1:
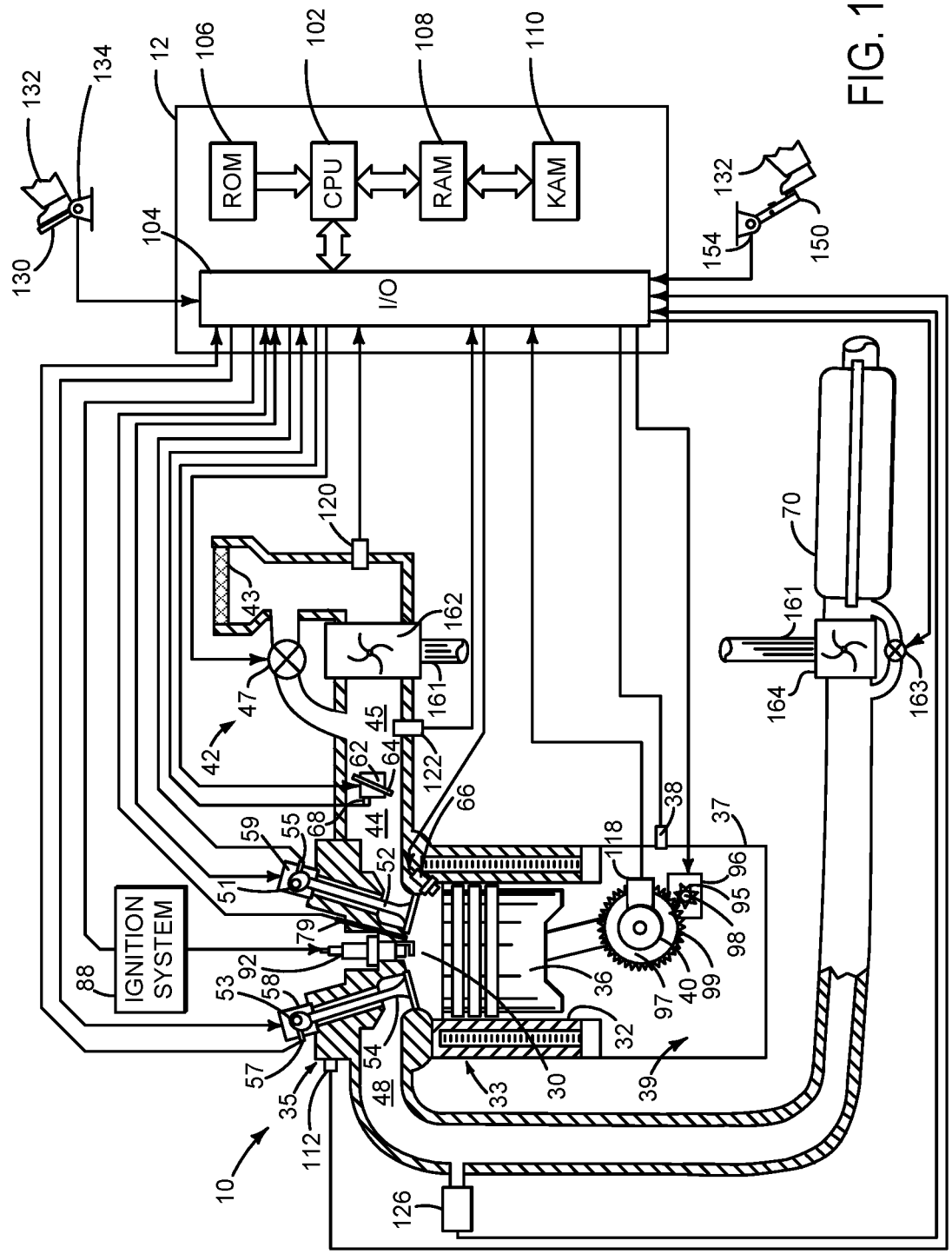
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices. Controller 12 may reduce compression in cylinder 30 via opening compression relief valve 79 during engine starting to reduce engine cranking torque.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus.

Controller 12 is shown receiving various signals from sensors coupled to engine 10, in addition to those signals previously discussed, including: cylinder head temperature from temperature sensor 112 coupled to cylinder head 35; a position sensor 134 coupled to an accelerator pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
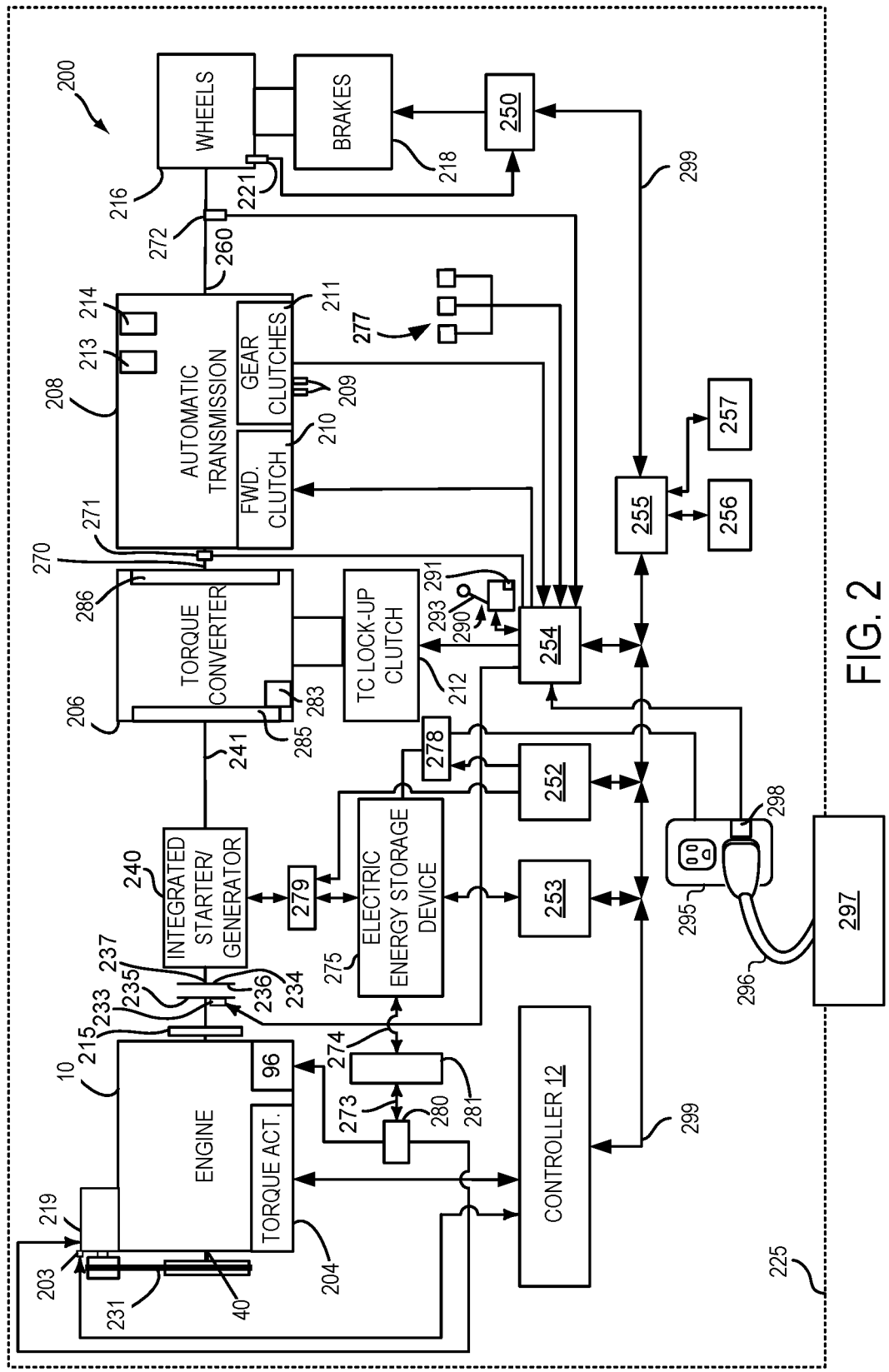
FIG. 2 shows a schematic diagram of an example vehicle driveline or powertrain including the internal combustion engine shown in FIG. 1.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Further, a user may override inhibiting of motion of wheels 216 when external electric power consumer 297 is coupled to vehicle 255. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via low voltage bus 273 and/or low voltage battery 280. BISG 219 may operate as a generator supplying electrical power to low voltage battery 280 and/or low voltage bus 273. Bi-directional DC/DC converter 281 may transfer electrical energy from a high voltage buss 274 to a low voltage buss 273 or vice-versa. Low voltage battery 280 is electrically directly coupled to low voltage buss 273. Low voltage bus 273 may be comprised of one or more electrical conductors. Electric energy storage device 275 is electrically coupled to high voltage buss 274. Low voltage battery 280 may selectively supply electrical energy to starter motor 96 and/or BISG 219.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Inverter 278 is shown electrically coupled to electric energy storage device 275 and electrical output receptacle 295. Inverter 278 may convert DC power to AC power for operating external electric power consumer 297 (e.g., hand tools, entertainment systems, lighting, pumps, etc.). Inverter 278 may convert electric power from low voltage battery 280, electric power from electric energy storage device 275, or electric power from ISG 240 or BISG 219 into electric power that is delivered to electrical output receptacle 295. External electric power consumer 297 may be located off-board vehicle 225 or they may be added to vehicle 225. External power consumer 297 may be electrically coupled to electrical output receptacle 295 via power cord 296. External electric power consumer sensor 298 may detect the presence or absence of external power consumer 297. Electric power consumer sensor 298 may physically sense the presence of cord 296 via a switch input, or alternatively, sensor 298 may be a current sensor and detect electric current flow out of electrical output receptacle 295 to determine the presence or absence of external power consumer 297.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel torque limit of 50 N-m, ISG power is adjusted to provide less than 50 N-m (e.g., 49 N-m) of negative torque at the wheels, including compensating for transmission gearing.

The system of FIGS. 1 and 2 provides for a vehicle system, comprising: an internal combustion engine; an emissions device included in an exhaust system of the internal combustion engine; a controller including executable instructions stored in non-transitory memory that cause the controller to inhibit automatic engine stopping and increase an upper battery state of charge threshold in response to a temperature of the emissions device exceeding a threshold temperature. The vehicle system includes where the upper battery state of charge threshold is a battery state of charge that is not to be exceeded by actual battery state of charge. The vehicle system further comprises additional instructions to permit automatic stopping of the internal combustion engine. The vehicle system includes where the internal combustion engine is automatically stopped when the temperature of the emissions device is less than the threshold temperature. The vehicle system further comprises additional instructions to decrease a battery state of charge threshold at which charging of a battery occurs via the internal combustion engine. The vehicle system further comprises additional instructions to adjust engine operation to reduce the temperature of the emissions device. The vehicle system includes where the temperature of the emissions device is reduced via reducing an engine torque reserve.

Although FIG. 2 shows only a single hybrid powertrain or driveline configuration, it should be appreciated that the present disclosure may be applicable to other hybrid driveline configurations such as series and series-parallel configurations.

Referring now to FIG. 3, plots of an example engine operating sequence is shown. The engine operating sequence that is shown in FIG. 3 may be provided via the system of FIGS. 1 and 2 in cooperation with the method of FIG. 4. The vertical lines at times t0-t6 represent times of interest during the engine operating sequence. The plots shown in FIG. 3 are aligned in time.

The first plot from the top of FIG. 3 is a plot of catalyst temperature versus time. The vertical axis represents the catalyst temperature and the catalyst temperature increases in the direction of the vertical axis arrow. The horizontal axis represents time and time increases from the left side of the plot to the right side of the plot. Horizontal line 350 represents a threshold temperature. Automatic engine stopping may not be permitted above threshold 350. Trace 302 represents catalyst temperature.

The second plot from the top of FIG. 3 is a plot of accelerator pedal position versus time. The vertical axis represents accelerator pedal position and the accelerator pedal position increases (e.g., is applied further) in the direction of the vertical axis arrow. Trace 304 represents accelerator pedal position. The horizontal axis represents time and time increases from the left side of the plot to the right side of the plot. Trace 304 represents accelerator pedal position.

The third plot from the top of FIG. 3 is a plot of an engine torque reserve versus time. The vertical axis represents the amount of engine torque reserve and the engine torque reserve amount increases in the direction of the vertical axis arrow. The horizontal axis represents time and time increases from the left side of the plot to the right side of the plot. Trace 306 represents the engine torque reserve amount. The engine torque reserve may be a difference between a maximum engine torque at an engine speed and present engine torque output at the engine speed.

The fourth plot from the top of FIG. 3 is a plot of an engine stop inhibit state versus time. The vertical axis represents the engine stop inhibit state and the engine stop inhibit state is asserted when trace 308 is at a higher level near the vertical axis arrow. The engine stop inhibit state is not asserted when trace 308 is at a lower level near the horizontal axis. Automatic engine stopping may be prohibited or inhibited when the engine stop inhibit state is asserted. Automatic engine stopping may be permitted when the engine stop inhibit state is not asserted. Trace 308 represents the engine stop inhibit state.

The fifth plot from the top of FIG. 3 is a plot of an engine operating state versus time. The vertical axis represents the engine operating state and the engine operating state is asserted when trace 310 is at a higher level near the vertical axis arrow. The engine operating state is not asserted when trace 310 is at a lower level near the horizontal axis. The engine is operating (e.g., rotating and combusting fuel) when the engine state is asserted. The engine is not operating (e.g., not rotating and combusting fuel) when the engine state is not asserted. Trace 310 represents the engine operating state.

The sixth plot from the top of FIG. 3 is a plot of a threshold state of charge (SOC) at which charging of the vehicle's battery by the engine may be initiated versus time. The vertical axis represents the threshold SOC at which charging of the vehicle's battery by the engine may be initiated. The horizontal axis represents time and time increases from the left side of the plot to the right side of the plot. Trace 312 represents the threshold SOC at which charging of the vehicle's battery by the engine may be initiated.

The seventh plot from the top of FIG. 3 is a plot of an automatic engine stop request state versus time. The vertical axis represents the automatic engine stop request state and the automatic engine stop request is asserted when trace 314 is at a higher level near the vertical axis arrow. The automatic engine stop request state is not asserted when trace 314 is at a lower level near the horizontal axis. Trace 314 represents the automatic engine stop request state. The horizontal axis represents time and time increases from the left side of the plot to the right side of the plot.

At time t0, the engine is operating (e.g., rotating and combusting fuel) at idle speed (not shown). The catalyst temperature is low and the accelerator pedal is not applied. The engine torque reserve is at a higher level and the engine stop inhibit is not asserted. The threshold SOC at which battery charging via the engine may be initiated is at a lower level. Automatic engine stopping has not been requested. Such conditions may be present after an engine has been cold started and while the engine is idling.

At time t1, the driver (not shown) applies the accelerator pedal causing the engine to generate torque (not shown). The catalyst temperature begins to increase shortly after time t1. The engine torque reserve decreases as the engine begins to generate torque. The engine stop inhibit request is not asserted and the engine continues to operate. The threshold SOC at which the engine may begin charging the traction battery is unchanged and automatic engine stopping is not requested.

At time t2, the driver (not shown) releases the accelerator pedal and the engine stop request is asserted shortly thereafter. The engine is stopped shortly after time t2 and the catalyst temperature is at a middle level. The engine torque reserve is reduced to zero since the engine is not operating and the engine stop inhibit is not asserted since catalyst temperature is low. The threshold SOC at which the engine may begin charging the traction battery is unchanged.

At time t3, the accelerator pedal is applied and the engine stop request is not asserted so that the engine starts as indicated by the engine state transitioning to a higher level. The catalyst temperature begins to rise and the engine torque increases after the engine is started. The threshold SOC at which the engine may begin charging the traction battery is unchanged. The accelerator pedal position increases to request additional torque from the engine after time t3.

At time t4, the catalyst temperature exceeds threshold 350 (e.g., an upper catalyst temperature limit that is not to be exceeded for extended periods of time) and the accelerator continues to be applied. The engine torque reserve is low since the engine is generating a high amount of torque (not shown). Engine stop inhibiting is now asserted and the engine continues to operate. The threshold SOC at which the engine may begin charging the traction battery is unchanged and automatic engine stopping is not requested.

At time t5, the vehicle driver (not shown) fully releases the accelerator pedal causing engine torque to be reduced (not shown). The catalyst temperature remains above threshold 350 so the engine stop inhibit is asserted and the engine is not automatically stopped. Rather, the engine continues to run and the engine torque reserve is lowered in response to catalyst temperature being above threshold 350 and the engine stop being inhibited. The threshold SOC at which the engine may begin charging the traction battery is increased so that engine load may be increased to increase flow of exhaust to the catalyst. The additional exhaust flow to the catalyst may help to cool the catalyst when exhaust temperatures are lower than catalyst temperature. The engine also provides useful work (e.g., charging the traction battery) while cooling the catalyst. Automatic engine stopping is requested, but it is not implemented because the engine stop inhibit is asserted.

At time t6, flow of exhaust to the catalyst (not shown) has cooled the catalyst below threshold 350. Consequently, the engine stop inhibit is withdrawn and the engine is automatically stopped. The automatic engine stop request remains asserted since the accelerator pedal is not applied and the driver demand torque (not shown) is low. The engine torque reserve is reduced to zero since the engine is stopped. The threshold SOC at which the engine may begin charging the traction battery is decreased since there is no further motivation to cool the catalyst.

In this way, automatic engine stopping may be inhibited so that an engine may continue to operate. By continuing to operate the engine, exhaust gases generated while the engine is operating at a lower load may be directed to an emissions device, thereby cooling the emissions device. Consequently, the possibility of emissions device degradation due to automatic engine stopping may be reduced. In addition, a SOC threshold may be adjusted so that engine exhaust flow may be increased to cool the emissions device sooner. Further, the engine's torque reserve may be reduced to permit the engine to advance spark timing, thereby further cooling engine exhaust and the emissions device.

Referring now to FIG. 4, a method for operating an engine is shown. The engine may be operating (e.g., rotating and combusting fuel) when method 400 is executed. At least portions of method 400 may be implemented as executable controller instructions stored in non-transitory memory. Method 400 may operate in cooperation with the system of FIGS. 1 and 2. Additionally, portions of method 400 may be actions taken in the physical world to transform an operating state of an actuator or device.

At 402, method 400 determines vehicle operating conditions. Vehicle operating conditions may be determined or estimated via the various sensors described herein. Vehicle operating conditions may include, but are not limited to vehicle speed, engine speed, catalyst temperature, driver demand torque, accelerator pedal position, engine temperature, and ambient temperature and pressure. Method 400 proceeds to 404.

At 404, method 400 judges if selected automatic engine stopping conditions are met. In one example, selected automatic engine stopping conditions may include driver demand torque being less than a threshold torque, engine temperature above a threshold temperature, and battery state of charge (SOC) greater than a threshold state of charge. If method 400 judges that conditions are met for automatic engine stopping, the answer is yes and method 400 proceeds to 406. Otherwise, the answer is no and method 400 proceeds to 430.

At 430, method 400 continues to operate the engine in its present state. If the engine is stopped, it remains stopped. If the engine is running, it remains running (e.g., rotating and combusting fuel). For example, driver demand torque is determined via maps that reference present accelerator pedal position and vehicle speed. The driver demand torque is converted to an engine torque and the engine torque is commanded via adjusting an engine torque actuator (e.g., throttle, fuel injectors, spark timing). The engine delivers the requested driver demand torque. Method 400 proceeds to exit.

At 406, method 400 asserts a request for an automatic engine stop. An automatic engine stop may be generated via a controller responding to vehicle conditions other than a state of an input device (e.g., key switch or pushbutton) that has a sole function of requesting engine stopping and/or starting. Method 400 proceeds to 408.

At 408, method 400 judges if a temperature of an emissions device (e.g., a catalyst, particulate filter, etc.) is greater than a first threshold temperature. In one example, the first threshold temperature is an emissions device light off temperature (e.g., a temperature at which emissions device efficiency is greater than a threshold amount). If method 400 judges that the temperature of the emissions device is greater than the first threshold temperature, the answer is yes and method 400 proceeds to 410. Otherwise, the answer is no and method 400 proceeds to 435.

At 435, method 400 inhibits automatic engine stopping (e.g., ceasing fuel delivery to the engine and stopping engine stopping in response to automatic engine stopping conditions being met). Thus, method 400 continues to allow fuel injection and spark to the engine even though selected automatic engine stopping conditions have been met. Method 400 proceeds to exit.

At 410, method 400 judges if a temperature of an emissions device (e.g., a catalyst, particulate filter, etc.) is less than a second threshold temperature. In one example, the second threshold temperature is based on thermal degradation of the emissions device. For example, the second threshold temperature may be a temperature at which the emissions device may begin to degrade. If method 400 judges that the temperature of the emissions device is less than the second threshold temperature, the answer is yes and method 400 proceeds to 412. Otherwise, the answer is no and method 400 proceeds to 420.

At 412, method 400 commands an automatic engine stop. The automatic engine stop is implemented via ceasing to deliver fuel and spark to the engine. Method 400 proceeds to exit.

At 420, method 400 inhibits automatic engine stopping (e.g., ceasing fuel delivery to the engine and stopping engine stopping in response to automatic engine stopping conditions being met). Thus, method 400 continues to allow fuel injection and spark to the engine even though selected automatic engine stopping conditions have been met. By inhibiting automatic engine stopping, it may be possible to cool the emissions device via cooler exhaust gases that may be generated at lower engine loads. The sooner that the emissions device is cooled, the sooner the engine may be deactivated to reduce fuel consumption. Method 400 proceeds to 422.

At 422, method 400 reduces the engine torque reserve. During nominal engine operating conditions, spark timing may be retarded from MBT spark timing when catalyst temperatures are less than the second threshold temperature and at low engine loads so that the engine may have ample torque in case driver demand increases quickly, or a load of an alternator increases, for example. Retarding the spark timing generates a larger engine torque reserve for meeting engine loads. However, it may be desirable to reduce the engine torque reserve when emissions device temperature is greater than the second threshold temperature. In particular, the engine torque reserve may be decreased via advancing spark timing toward MBT spark timing. Advancing spark timing may further cool engine exhaust while the engine is running so that the emissions device may be cooled below the second threshold temperature sooner. The engine torque reserve may be reduced while the engine is at idle or other low engine load conditions. Method 400 proceeds to 424.

At 424, method 400 increases a battery maximum SOC threshold. By increasing the SOC threshold, the battery may receive additional charge via the engine rotating a generator or alternator. Rotating the alternator or generator increases engine load to increase the exhaust flow rate, but the increase in engine load is less than what would be needed to increase emissions device temperature. Therefore, the additional exhaust flow may operate to further reduced the temperature of the emissions device. Method 400 proceeds to 426.

At 426, method 400 increases a battery SOC threshold at which the engine may begin to charge the traction battery or other battery. By increasing the battery SOC threshold at which the engine may begin to charge the battery, the engine may start charging the battery at higher SOC levels so that the engine may charge the battery and operate at higher loads. By operating the engine at a higher load, it may be possible to reduce an amount of time it takes to reduce the temperature of the emissions device. Method 400 proceeds to exit.

In this way, automatic engine stopping may be inhibited to reduce a possibility of emissions device degradation. Further, engine exhaust flow rates may be maintained at higher levels via reducing an engine torque reserve and via adjusting SOC thresholds so that the emissions device may be cooled to a desired temperature sooner.

Thus, the method of FIG. 4 provides for a method for operating a vehicle, comprising: inhibiting automatic engine stopping via a controller in response to a temperature of an emissions device being greater than a threshold temperature. The method includes where the threshold temperature is a temperature at which thermal degradation of the emissions device is greater than a threshold amount. The method further comprises permitting automatic engine stopping in response to the temperature of the emissions device being less than the threshold temperature. The method includes where temperature of the emissions device is measured or inferred. The method further comprises reducing a torque reserve of the engine in response to the temperature of the emissions device being greater than the threshold temperature. The method includes where the torque reserve is reduced while the engine is idling. The method includes where the torque reserve is reduced while driver demand torque is less than a threshold.

The method of FIG. 4 also provides for a method for operating a vehicle, comprising: inhibiting automatic engine stopping via a controller in response to a temperature of an emissions device being greater than a threshold temperature; and adjusting operation of an engine to reduce the temperature of the emissions device in response to driver demand torque being less than a threshold while inhibiting automatic engine stopping. The method includes where adjusting engine operation includes reducing a torque reserve of the engine. The method includes where adjusting engine operation includes adjusting engine torque to adjust charging of a battery via the engine. The method further comprises increasing a battery state of charge upper threshold in response to inhibiting automatic engine stopping. The method further comprising increasing a battery state of charge threshold at which a battery is charged via the engine. The method further comprises permitting automatic engine stopping in response to the temperature of the emissions device being less than the threshold temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
responsive to a temperature of an emissions device being greater than a threshold temperature,
inhibiting automatic stopping of an engine of the vehicle via a controller; and
reducing a torque reserve of the engine.

2. The method of claim 1, where the threshold temperature is a temperature at which thermal degradation of the emissions device is greater than a threshold amount.

3. The method of claim 1, further comprising permitting automatic engine stopping in response to the temperature of the emissions device being less than the threshold temperature.

4. The method of claim 1, where temperature of the emissions device is measured or inferred.

5. The method of claim 1, where the torque reserve is reduced while the engine is idling.

6. The method of claim 1, where the torque reserve is reduced while driver demand torque is less than a threshold.

7. A vehicle system, comprising:
an internal combustion engine;
an emissions device included in an exhaust system of the internal combustion engine; and
a controller including executable instructions stored in non-transitory memory that cause the controller to inhibit automatic engine stopping and increase an upper battery state of charge threshold in response to a temperature of the emissions device exceeding a threshold temperature.

8. The vehicle system of claim 7, where the upper battery state of charge threshold is a battery state of charge that is not to be exceeded by actual battery state of charge.

9. The vehicle system of claim 8, further comprising additional instructions to automatically stop the internal combustion engine.

10. The vehicle system of claim 9, where the internal combustion engine is permitted to automatically stop when the temperature of the emissions device is less than the threshold temperature.

11. The vehicle system of claim 7, further comprising additional instructions to increase a battery state of charge threshold at which charging of a battery occurs via the internal combustion engine.

12. The vehicle system of claim 7, further comprising additional instructions to adjust engine operation to reduce the temperature of the emissions device.

13. The vehicle system of claim 12, where the temperature of the emissions device is reduced via reducing an engine torque reserve.

14. A method for operating a vehicle, comprising:
inhibiting automatic engine stopping via a controller in response to a temperature of an emissions device being greater than a threshold temperature; and
adjusting operation of an engine to reduce the temperature of the emissions device in response to driver demand torque being less than a threshold while inhibiting automatic engine stopping.

15. The method of claim 14, where adjusting engine operation includes reducing a torque reserve of the engine.

16. The method of claim 14, where adjusting engine operation includes adjusting engine torque to adjust charging of a battery via the engine.

17. The method of claim 14, further comprising increasing a battery state of charge upper threshold in response to inhibiting automatic engine stopping.

18. The method of claim 14, further comprising increasing a battery state of charge threshold at which a battery is charged via the engine.

19. The method of claim 14, further comprising permitting automatic engine stopping in response to the temperature of the emissions device being less than the threshold temperature.

* * * * *